UNITED STATES PATENT OFFICE 2,687,348

HERBICIDAL COMPOSITIONS

Milton Kosmin, Dayton, Ohio, assignor to Monsanto Chemical Company, St. Louis, Mo., a corporation of Delaware No Drawing. Application September 17, 1952,
Serial No. 310,113

6 Claims. (Cl. 71—2.7)

The present invention provides new and highly valuable herbicidal compositions and methods of destroying and/or defoliating plants in which said compositions are used.

I have found that improved, very efficient herbicidal compositions are obtained when there are prepared oil-in-water emulsions of condensation products of one mole of an alkylenepolyamine having not more than 4 amine radicals per molecule and one mole of a substantially mono-chlorinated kerosene. Such condensates form the subject of the copending Matthews application, Serial No. 225,909, filed May 11, 1951, and assigned to the same assignee as is the present application.

The alkylenepolyamine-chlorinated kerosene condensates which are useful for the present purpose may be represented by the general formula

X—NH—R—(NH—R)$_n$—NH—Y in which R is an alkylene radical of from 2 to 3 carbon atoms, $n$ is 0, 1 or 2, X is selected from the class consisting of hydrogen and lower alkyl radicals and Y is the keryl radical, i. e., an alkyl radical derived from substantially mono-chlorinated kerosene. As shown in the above-cited Matthews application, condensates having this formula are readily obtainable by heating an alkylenepolyamine having not more than 4 amine groups per molecule and from 2 to 3 carbon atoms in each alkylene group with a chlorinated kerosene prepared by substantial mono-chlorination of a kerosene distilling between approximately 150° C. and 300° C. Substantial mono-chlorination of kerosene or a fraction thereof may be obtained by introducing chlorine into the kerosene until the kerosene is substantially one-third to two-thirds chlorinated on a molar basis.

As examples of condensates useful for the present purpose may be mentioned those obtained by heating one mole of a substantially mono-chlorinated kerosene with one mole of such alkylenepolyamines as ethylene diamine, trimethylenediamine, propylenediamine, the dipropylenetriamines, diethylenetriamine, triethylenetetramine, etc.

Herbicidal compositions containing the present condensates are readily obtained by first preparing a solution of the condensate in an organic solvent and then adding the resulting solution to water containing an emulsifying agent to form an emulsion. Because of the very high herbicidal efficiency of the condensates, they are present in the herbicidal composition in only very small concentrations, for example, in concentrations of from 0.1 per cent to 2 per cent by weight of the total weight of the emulsion. Emulsifying agents which may be employed are those customarily used in the art for the preparation of oil-in-water emulsions. The word "oil" is here used to designate any liquid which is insoluble in water. Since the alkylenepolyamine-chlorinated kerosene condensates are highly stable compounds of little chemical reactivity, they are not affected by either ionic or nonionic emulsifying agents. Examples of emulsifying agents which may be used include alkylbenzenesulfonates, long-chained polyalkylene glycols, long-chained succinates, etc.

The present emulsions may be used to destroy already existing plant growth by direct application to the undesirable plants, e. g., by spraying; or the emulsions may be employed to prevent plant growth by application to media which normally support plant growth. When employed to prevent plant growth, for example in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However the emulsions may be incorporated into customarily employed temporary surfacing materials, e. g., oils, cinders, etc.

Herbicidal compositions comprising the alkylenepolyamine-chlorinated kerosene condensates are particularly valuable in compositions for defoliating plants prior to harvesting of non-leafy crops, e. g., cotton, beans, peas, etc. Application of the herbicidal compositions to such plants results in leaf-drop and thus permits more efficient machine-harvesting or handpicking of the bolls or pods.

The present invention is further illustrated, but not limited, by the following example:

Example

This example shows herbicidal evaluation of a mono-N-keryl-substituted diethylenetriamine prepared by heating diethylenetriamine with a chlorinated kerosene obtained by introducing chlorine into a kerosene fraction, B. P. 204.5°–224.5° C., consisting substantially of paraffin hydrocarbons, until said fraction was substantially 37% chlorinated on a molar basis.

A cyclohexanone solution of the keryldiethylenetriamine and an emulsifying agent were added to water, the quantity of solution employed being calculated to give emulsions containing 1.0 per cent and 0.3 per cent of the condensate, respectively, based on the weight of the total emulsion. The quantity of emulsifying agent used was 0.2 per cent by weight, based on the weight of the total emulsion. Said emulsifying agent comprised a mixture of a polyalkyleneglycol derivative and an alkylbenzenesulfonate.

Three-week old corn and bean plants, respectively, were sprayed with the emulsions, two plants of each variety being employed. The spraying was continued until droplets formed on and/or fell from the foliage and stems of the sprayed plants, up to 15 ml. of the emulsion being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any. Both the corn and bean plants which had been sprayed with the 1.0 per cent emulsion were completely dead and the leaves thereof dried and dropped. Bean plants which had been sprayed with the 0.3 per cent emulsion were severely injured, whereas the corn plants were only moderately affected at this concentration.

While the present alkylenepolyamine-chlorinated kerosene condensates are most advantageously employed as herbicides by incorporating them into an aqueous emulsion as herein described, they may also be employed in other plant-destroying methods. Thus they may be incorporated into solid carriers such as clay, talc, pumice and bentonite, or they may be mixed with liquid or solid agricultural pesticides, e. g., insecticides and fungicides. While solutions of the condensates in organic solvents may be employed for preventing and destroying plant growth, we have found that the emulsions possess an improved tendency to adhere to the treated surfaces and that less of the active ingredient is required to give comparable herbicidal efficiency.

What I claim is:

1. A herbicidal composition comprising an oil-in-water emulsion of the condensation product of substantially one mole of an alkylenepolyamine having not more than 4 amine radicals per molecule and from 2 to 3 carbon atoms in the alkylene radical and substantially one mole of a substantially mono-chlorinated kerosene, said condensation product being present in said composition in a quantity which is toxic to plant life.

2. A herbicidal composition comprising an oil-in-water emulsion of the condensation product of substantially one mole of diethylenetriamine and substantially one mole of a substantially mono-chlorinated kerosene, said condensation product being present in said composition in a quantity which is toxic to plant life.

3. The method of destroying undesirable plants which comprises applying to said plants a toxic quantity of a herbicidal composition comprising, as the essential active ingredient, a condensation product of substantially one mole of an alkylenepolyamine having not more than 4 amine radicals per molecule and from 2 to 3 carbon atoms in the ethylene radical and substantially one mole of a substantially mono-chlorinated kerosene.

4. The method of destroying undesirable plants which comprises applying to said plants a toxic quantity of an oil-in-water emulsion of a condensation product of substantially one mole of an alkylenepolyamine having not more than 4 amine radicals per molecule and from 2 to 3 carbon atoms in the alkylene radical and substantially one mole of a substantially mono-chlorinated kerosene.

5. The method of destroying undesirable plants which comprises applying to said plants a toxic quantity of a herbicidal composition comprising, as the essential active ingredient, a condensation product of substantially one mole of diethylenetriamine and substantially one mole of a substantially mono-chlorinated kerosene.

6. The method of destroying undesirable plants which comprises applying to said plants a toxic quantity of an oil-in-water emulsion of the condensation product of substantially one mole of diethylenetriamine and substantially one mole of a substantially mono-chlorinated kerosene.

References Cited in the file of this patent

UNITED STATES PATENTS

| Number | Name | Date |
| --- | --- | --- |
| 2,267,204 | Kyrides | Dec. 23, 1941 |